United States Patent
Beier et al.

(10) Patent No.: US 7,269,663 B2
(45) Date of Patent: Sep. 11, 2007

(54) TAGGING PACKETS WITH A LOOKUP KEY TO FACILITATE USAGE OF A UNIFIED PACKET FORWARDING CACHE

(75) Inventors: Niels Beier, Copenhagen (DK); Jacob M. Christensen, Virum (DK); Kjeld B. Egevang, Smørum (DK)

(73) Assignee: Intel Corporation, Santa Clara, CA (US)

( * ) Notice: Subject to any disclaimer, the term of this patent is extended or adjusted under 35 U.S.C. 154(b) by 695 days.

(21) Appl. No.: 09/967,084

(22) Filed: Sep. 28, 2001

(65) Prior Publication Data

US 2003/0065812 A1   Apr. 3, 2003

(51) Int. Cl.
*G06F 15/173* (2006.01)
(52) U.S. Cl. .............. 709/238; 709/212; 709/214; 709/215; 709/242; 711/3; 711/118; 711/147; 711/213; 711/216; 711/221
(58) Field of Classification Search ......... 709/104, 709/212, 238, 214, 215, 245, 242; 711/113, 711/118, 3, 147, 213, 216, 221; 707/205
See application file for complete search history.

(56) References Cited

U.S. PATENT DOCUMENTS

| | | | | |
|---|---|---|---|---|
| 4,916,605 A | * | 4/1990 | Beardsley et al. | 711/162 |
| 5,574,849 A | * | 11/1996 | Sonnier et al. | 714/12 |
| 6,101,589 A | * | 8/2000 | Fuhrmann et al. | 711/169 |
| 6,128,623 A | * | 10/2000 | Mattis et al. | 707/103 R |
| 6,141,692 A | * | 10/2000 | Loewenstein et al. | 709/234 |
| 6,182,226 B1 | * | 1/2001 | Reid et al. | 713/201 |
| 6,243,667 B1 | * | 6/2001 | Kerr et al. | 703/27 |
| 6,266,705 B1 | * | 7/2001 | Ullum et al. | 709/238 |
| 6,292,880 B1 | * | 9/2001 | Mattis et al. | 711/216 |
| 6,298,411 B1 | * | 10/2001 | Giacalone | 711/3 |

(Continued)

FOREIGN PATENT DOCUMENTS

WO   WO99 53648 A   10/1999

OTHER PUBLICATIONS

"NetFlow Services and Applications," White Paper, Cisco Systems, Inc. 1999.

(Continued)

*Primary Examiner*—Michael Y. Won
(74) *Attorney, Agent, or Firm*—Blakely, Sokoloff, Taylor & Zafman LLP

(57) ABSTRACT

Apparatus and methods are provided for a Network Address Translation (NAT)-aware unified cache. According to one embodiment, multiple packet-processing applications distributed among one or more processors of a network device share one or more unified caches without requiring a cache synchronization protocol. When a packet is received at the network device, a first packet-processing application, such as NAT or another application that modifies part of the packet header upon which a cache lookup key is based, tags the packet with a cache lookup key based upon the original contents of the packet header. Then, other packet-processing applications attempting to access the cache entry from the unified cache subsequent to the tagging by the first packet-processing application use the tag (the cache lookup key generated by the first packet-processing application) rather than determining the cache lookup key based upon the current contents of the packet header.

21 Claims, 9 Drawing Sheets

U.S. PATENT DOCUMENTS

| | | | |
|---|---|---|---|
| 6,353,614 B1 * | 3/2002 | Borella et al. | 370/389 |
| 6,418,476 B1 * | 7/2002 | Luciani | 709/238 |
| 6,587,113 B1 * | 7/2003 | Baldwin et al. | 345/557 |
| 6,631,419 B1 * | 10/2003 | Greene | 709/238 |
| 6,650,641 B1 * | 11/2003 | Albert et al. | 370/392 |
| 6,661,799 B1 * | 12/2003 | Molitor | 370/401 |
| 6,751,583 B1 * | 6/2004 | Clarke et al. | 703/17 |
| 6,754,662 B1 * | 6/2004 | Li | 707/101 |
| 6,754,784 B1 * | 6/2004 | North et al. | 711/145 |
| 6,836,805 B1 * | 12/2004 | Cook | 709/245 |
| 6,883,099 B2 * | 4/2005 | Terrell et al. | 713/200 |
| 7,058,642 B2 * | 6/2006 | Kurupati et al. | 707/101 |
| 7,061,500 B1 * | 6/2006 | Baldwin | 345/582 |
| 7,062,570 B2 * | 6/2006 | Hong et al. | 709/238 |
| 2002/0116527 A1 * | 8/2002 | Chen et al. | 709/245 |
| 2003/0009585 A1 * | 1/2003 | Antoine et al. | 709/238 |

OTHER PUBLICATIONS

"Intel® IXP1200 Network Processor," Datasheet by Intel, Part No. 278298-008, May 2001.

PCT International Search Report, PCT/US 02/31154, Jun. 5, 2003, 4 pages.

Chandranmenon, G.P. et al., "Trading Packet Headers for Packet Processing", IEEE/ ACM Transactions on Networking, XP 000582666, 1996, pp. 141-152.

PCT/US02/31154, May 20, 2004, Written Opinion.

* cited by examiner

TAGGING PACKETS WITH A LOOKUP KEY TO FACILITATE USAGE OF A UNIFIED PACKET FORWARDING CACHE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of networking devices. More particularly, the invention relates to a method and apparatus for forwarding network packets with a unified packet Internet Protocol (IP) flow-based cache using the cache lookup key as a packet tag.

2. Description of the Related Art

A number of different processes are performed by network devices, such as bridges, routers, switches, firewalls, gateways or other Internet access products, on each received or transmitted packet. For example a typical list of tasks performed by a router might include: (1) applying Network Address Translation (NAT), (2) applying packet filtering, and (3) routing the packet.

A lookup in a complete routing table of a network device can be quite slow. Therefore, many networking devices implement some kind of caching functionality to speedup packet processing. Typically, the most recent forwarding decisions are stored in separate table (the forwarding cache) that is optimized for fast lookup. If a packet flow has been classified and a subsequent packet can be handled using the cache information, the forwarding path is typically called the "fast path." If no cache entry is present, the packet is forwarded based on the full routing table. This forwarding path is called the "slow path." The same kind of caching mechanism can also be applied to NAT and filtering. Older products typically used independent caches for each type of functionality. An exemplary forwarding flow using separate caches is illustrated by the following:

Read header information from the packet.

Make lookup in the NAT cache. If cache hit, then perform NAT actions (e.g., translate addresses in the IP header). Otherwise, send the packet to the NAT module for slow path processing.

Make lookup in the filtering cache. If cache hit, then perform filtering actions (e.g., pass or discard packet). Otherwise, send the packet to the filtering module for slow path processing.

Make lookup in the forwarding/routing cache. If cache hit, then perform routing actions (e.g., forward packet on the interface specified in the cache entry). Otherwise, send the packet to the forwarding module for slow path processing.

The fast/slow path concept in the context of routing will now be further described with reference to FIG. 1. In this simplified example, a forwarding flow 100 is illustrated in a router having (1) a fast path that includes processing of a received network packet 105 by a fast path forwarding module 110 and a cache lookup in a forwarding cache 115; and (2) a slow path that includes, in addition to the fast path processing, packet processing by a slow path forwarding module 120 and a full routing table lookup in a routing table 125.

In many cases, the fast path processing is located on a different processing unit than the slow path processing (for example, in a different microengine on the same network processor or on a different network processor). In single processor systems, the fast path code and slow path code are typically executed as different operating system processes. As a result, process scheduling is required when passing the packet to the slow path. While the notion of a fast path and a slow path remain, newer network products often use a concept commonly known as "flow-based forwarding." The basic idea in flow-based forwarding is to classify the packet once and then perform a single lookup in an unified cache in which each cache entry contains all the information necessary to handle the packet (e.g., information regarding where to forward the packet). However, since the packet-processing functions are often located in separate modules (in some cases run by different processors and/or microengines), it can become quite complex to ensure that the unified cache remains consistent. Additionally, as will be discussed further below, there are other complications involved with the use of a unified cache when one or more of the packet-processing functions modify part of the packet header upon which the cache lookup key is based.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
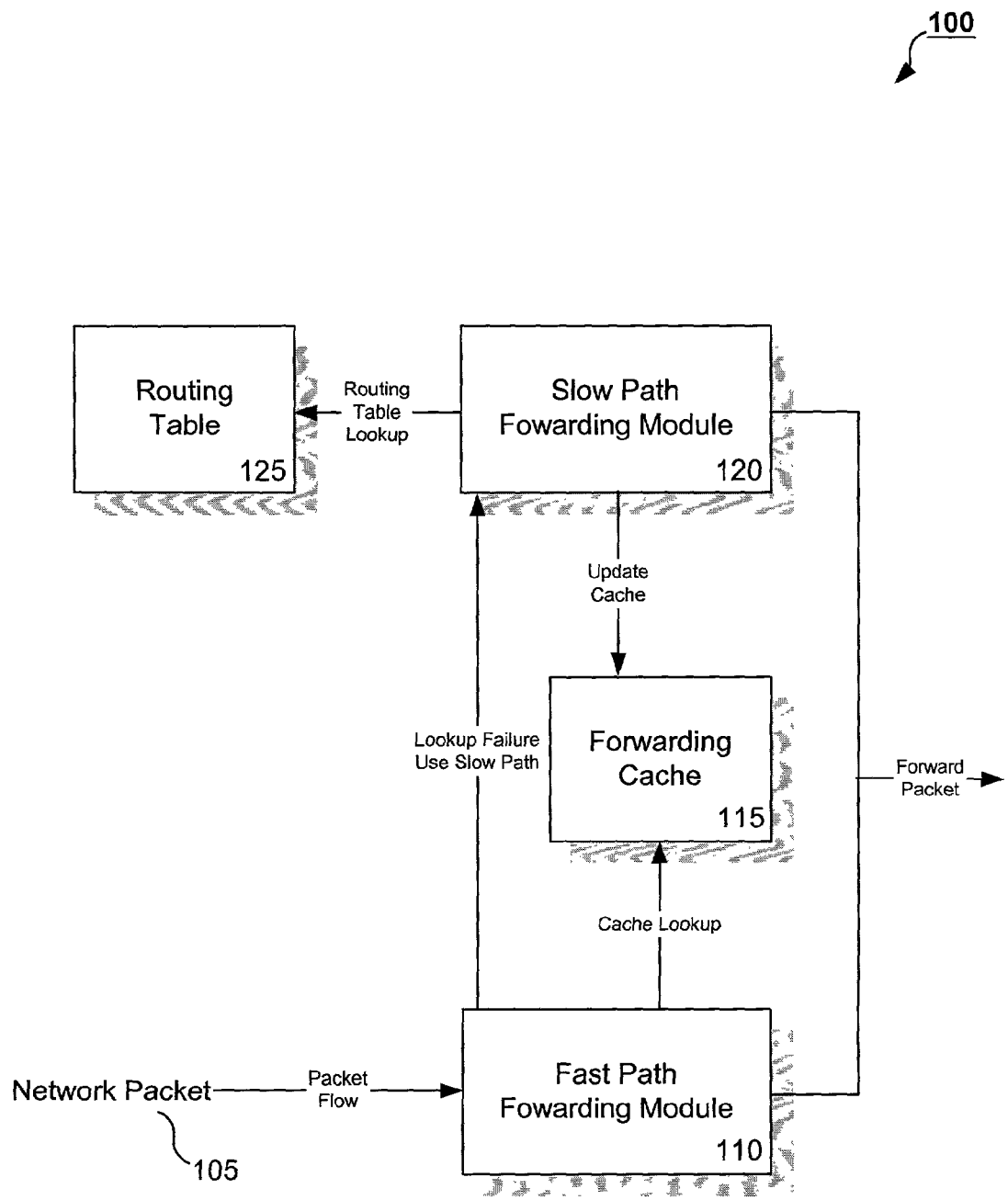
FIG. 1 illustrates the fast/slow path concept in the context of routing.

Apparatus and methods are described for a NAT-aware unified cache. Broadly stated, embodiments of the present invention seek to provide a mechanism for efficiently implementing a unified cache in an environment that includes an application, such as NAT, that modifies one or more portions of the packet, such as the packet header, upon which a cache lookup key is based. According to one embodiment, the cache lookup key is stored as part of a packet tag and made available to all tasks involved in packet flow processing. Then, the first application that inspects a network packet, tags the packet with cache lookup information from the original packet header and subsequent packet-processing applications use the cache lookup key in the tag when they access the unified cache. In this manner, cache access is performed consistently by all packet-processing applications. Additionally, the unified cache architecture and method described herein seek to improve the manner in which a unified cache is shared among distributed modules of a network device. According to one embodiment, a straightforward and uncomplicated mechanism is provided for discovering deleted or invalidated cache entries and preventing creation of duplicate entries without requiring a cache synchronization protocol.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product that may include a machine-readable medium having stored thereon instructions that may be used to program a computer (or other electronic devices) to perform a process according to the present invention. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

While, for convenience, embodiments of the present invention are described with reference to a network device with NAT functionality, the present invention is equally applicable to various other packet-processing applications that involve modifying all or part of the portion of the packet header that is used for cache lookup key generation.

Terminology

Before describing an exemplary network environment in which various embodiments of the present invention may be implemented, some terms that will be used throughout this application will briefly be defined.

As used herein a "network device" generally refers to an intermediate device that facilitates computer-to-computer communications over an interconnected set of local area networks (LANs). Exemplary network devices include gateways, routers, switches, bridges, firewalls, and Internet access products.

The term "network interface" or simply "interface" generally refers to a physical or logical interface of a network device through which packets may be received or transmitted. An example of a physical interface is an Ethernet port. An example of a logical interface is port 80, the standard port number for the Hyper Text Transfer Protocol (HTTP) service, or interfaces for other protocol services.

The terms "packet-processing application," "packet-processing task," "packet-processing function" or "module" generally refer to a hardware, software, or hybrid module of a network device that performs a discrete function or set of operations during the forwarding of a packet, for example, from the ingress port of the network device to the packet's intended destination through the egress port of the network device. Exemplary packet-processing applications include receive NAT, receive static filtering, receive firewall filtering, routing cache lookup (forwarding), transmit static filtering, transmit firewall filtering, transmit NAT, and the like.

As used herein "module-specific information" generally refers to information utilized by a particular packet-processing application.

As used herein a "unified cache" or a "unified forwarding cache" generally refers to a caching mechanism, typically a memory separate from the complete routing table that stores the most recent forwarding decisions and that is optimized for fast lookup, that is shared by multiple packet forwarding processes. According to one embodiment of the present invention, the unified cache is a unified IP flow-based cache that allows a flow to be classified once and then subsequent packets can be processed with a single lookup in the unified cache.

As used herein a "cache synchronization protocol" generally refers to a centralized mechanism through which packet-processing applications distributed on different processors may keep each other up-to-date regarding the current status of entries in a unified cache. For example, a cache synchronization management application may track the number of pointers that have been created for a particular cache entry and whether cache entries are valid or not.

As used herein a "packet descriptor" generally refers to an internal data structure used by the packet-processing applications that is associated with a packet and contains packet specific information. According to one embodiment of the present invention, the packet descriptor contains one or more of the following: (1) the memory address of the packet (e.g., a pointer to the packet data), (2) the length of the packet, (3) an indication of the network interface upon which the packet was received, and (4) a unified cache lookup key.

Difficulties Associated with Implementing a Unified Cache that Supports NAT

Figure 2:
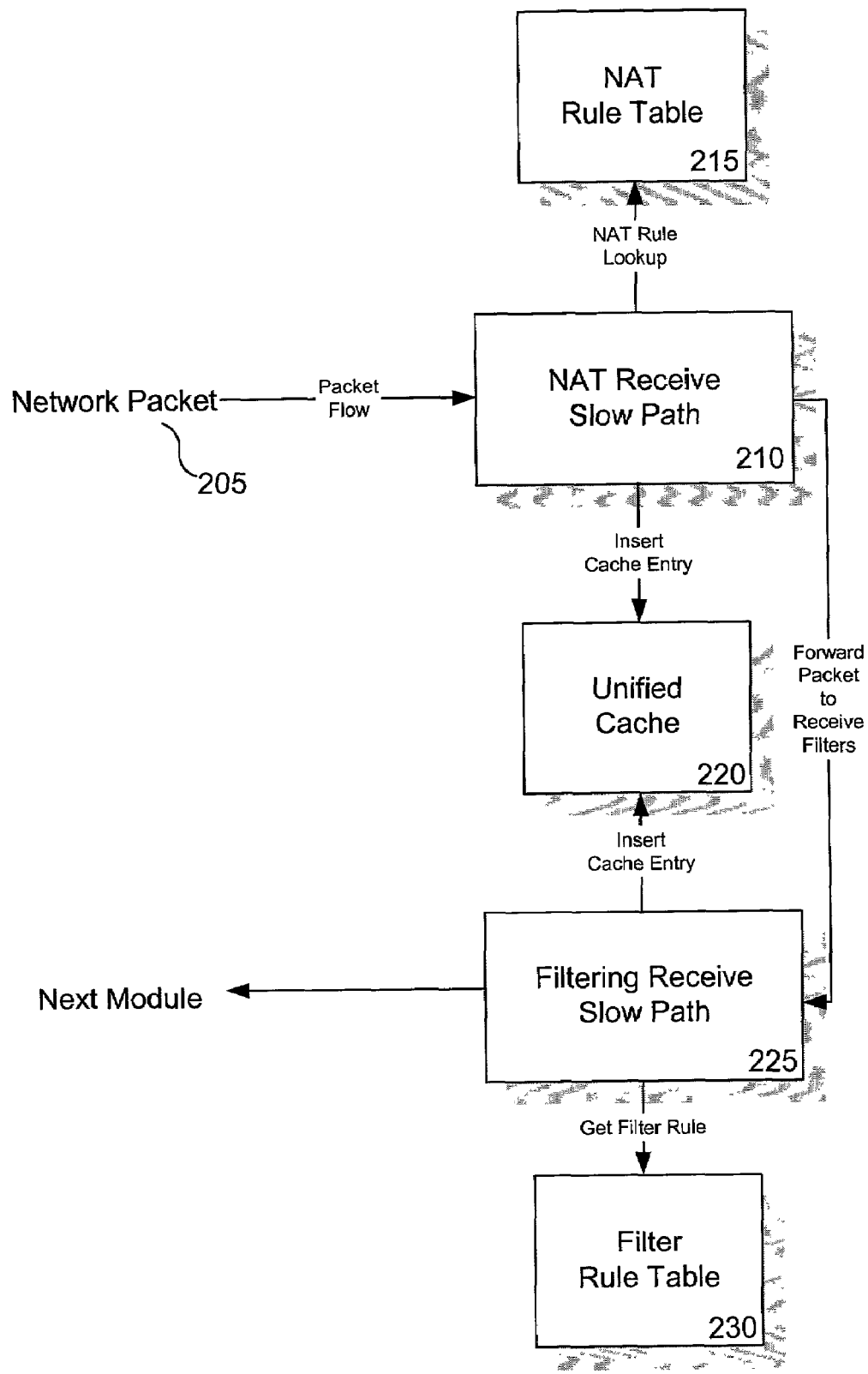
FIG. 2 illustrates one problem of implementing a unified cache supporting NAT.

FIG. 2 illustrates one problem of implementing a unified cache supporting NAT. The main problem in connection with implementing a unified cache supporting NAT is that it may change the packet header thereby causing packet-processing applications following NAT to be unable to locate unified cache entries. For example, NAT may create a unified cache entry based upon the original content of the packet header before it changes the packet header. As a result, subsequent modules generate a different cache lookup key based on the modified packet header and look in the wrong bin for the unified cache entry. This scenario will now be illustrated with a concrete example with reference to FIG. 2.

The network device receives a packet 205 destined for IP address 89.20.171.1, for example. Assuming the packet 205 is received by the NAT receive slow path 210 (i.e., no cache entry is present in a unified cache 220 for this destination IP address), the NAT receive slow path 210 translates the destination IP address in the packet's header to 10.1.1.1, for example, using a translation rule retrieved from the full NAT rule table 215. Then, the NAT receive slow path 210 inserts a cache entry into the unified cache 220 based upon a lookup key generated from the original contents of the packet header which included destination IP address 89.20.171.1. In this manner, subsequently received packets destined for IP address 89.20.171.1 will take the NAT receive fast path (not shown) thereby avoiding the expense of performing a lookup in the full NAT rule table 215 and the address translation will be performed based upon the cache entry inserted by the NAT receive slow path 210.

At any rate, continuing with the present example, the NAT receive slow path 210, after having translated the packet header and inserted an entry in the unified cache 220, passes the packet to the next module. In this example, the module following NAT is filtering. When the filtering module receives the NAT processed packet, the filtering code reads the packet header and makes a cache lookup in the unified cache 220 based on the current content of the packet header which includes destination IP address 10.1.1.1. No entry is found because NAT inserted the entry with a lookup key that was based on the original destination IP address, 89.20.171.1. Consequently, the packet is passed to the filtering receive slow path 225 which must now retrieve a filtering rule from the full filter rule table 230. After performing filtering, the filtering receive slow path 225 inserts a new cache entry with a lookup key based on the contents of the current packet header which includes destination IP address 10.1.1.1. As a result, in this example, the NAT receive slow path 210 and the filtering receive slow path created duplicate unified cache entries associated with different cache lookup keys.

An efficient unified cache implementation should not unnecessarily create duplicate unified cache entries. Rather, all information for the cache entry should typically be stored in a single unified cache entry using a consistent and predictable cache lookup key. One convention would be to generate the cache lookup key based upon the original contents of the packet header which, in this example, included IP destination address 89.20.171.10.

Figure 3:
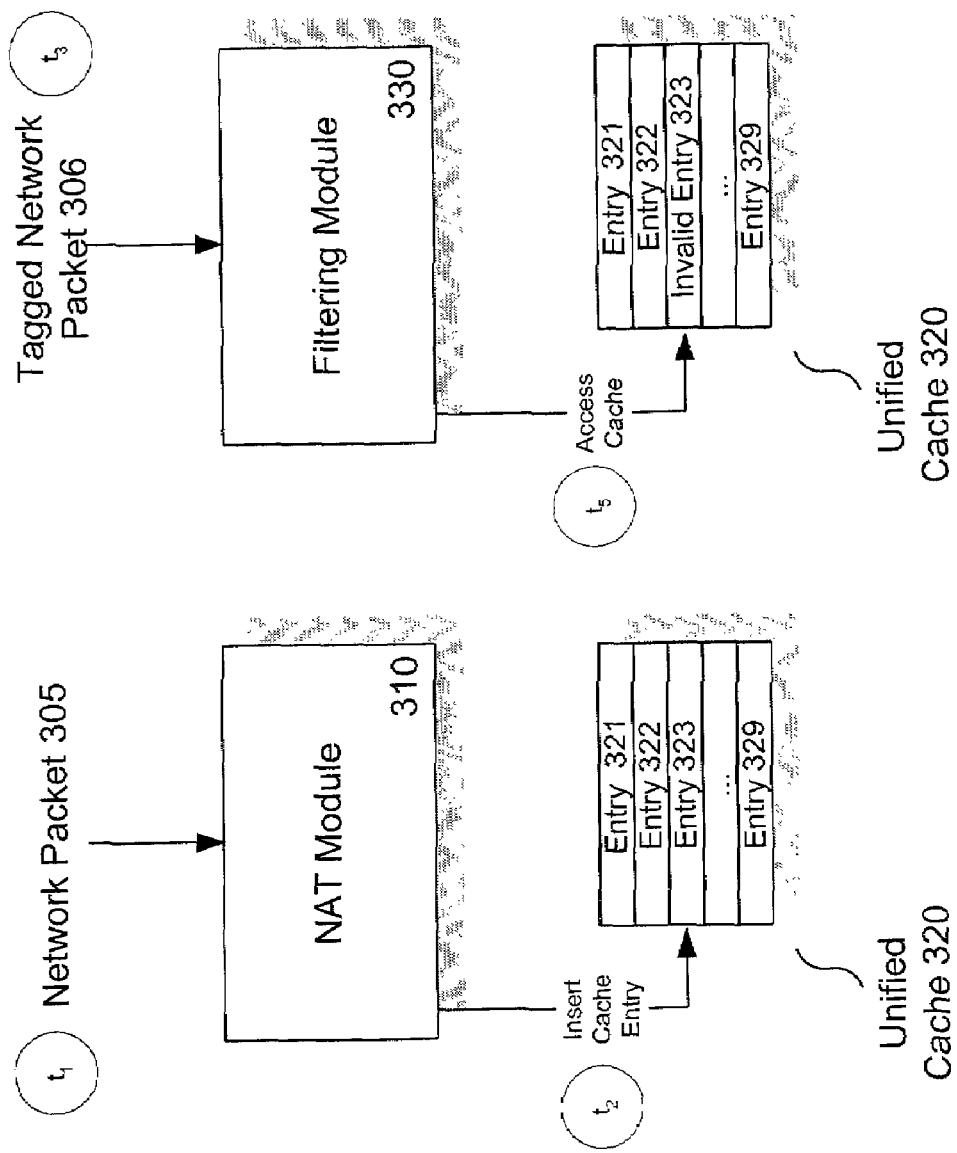
FIGS. 3A-3C illustrate an example of a synchronization problem that may be encountered when attempting to perform distributed packet processing in a unified cache environment.

Another problem in connection with employing a unified cache is synchronization of the different modules that use the unified cache. FIGS. 3A-3C illustrate an example of a synchronization problem that may be encountered when attempting to perform distributed packet processing in a unified cache environment. In this example, it is assumed that the modules pass to the next module a pointer to a unified cache entry. In FIG. 3A, a NAT module 310 receives a network packet 305 at a time, $t_1$. Subsequently, at time, $t_2$, the NAT module inserts a cache entry 323 into a unified cache 320 shared by, among other modules, a filtering module 330. After the NAT module 310 has completed its translation processing, it tags the translated network packet 305 with a pointer to the cache entry 323. As illustrated in FIG. 3B, the NAT module 310 at time, $t_3$, passes the translated network packet 305 along with a pointer to the cache entry 323 as tagged network packet 306 to the filtering module 330 by way of an inter process queue, for example, as the filtering module 330 may be a separate process. Before the filtering module 330 is allowed to run, however, as illustrated in FIG. 3C, the NAT module 310 at time, $t_4$, decides to remove the cache entry 323 due to a reconfiguration event, for example, thereby invalidating entry 323. As a result, the cache entry pointer passed with the tagged network packet 306 is now invalid. In the absence of a cache synchronization mechanism, when filtering module 330 uses the pointer to access the unified cache 320 at time, $t_5$, to retrieve the cache entry 323 corresponding to the tagged network packet 306, filtering will produce uncertain results as it will be performed based on invalid data. Therefore, a reliable mechanism for sharing a unified cache should provide for detecting deleted or invalidated cache entries and preventing creation of duplicate entries without requiring the overhead and complexity of implementing a cache synchronization protocol.

The unified cache architecture and method described herein seeks to address both of the above noted problems. According to one embodiment, the first application to inspect the packet, tags the packet with lookup information based upon the original packet header. Then, succeeding packet-processing applications use the original packet lookup information (the tag) as the lookup key when they update or otherwise access the unified cache. If the entry has been deleted (as in the above example), the lookup will fail and consistency is ensured.

Exemplary Network Device

Figure 4:
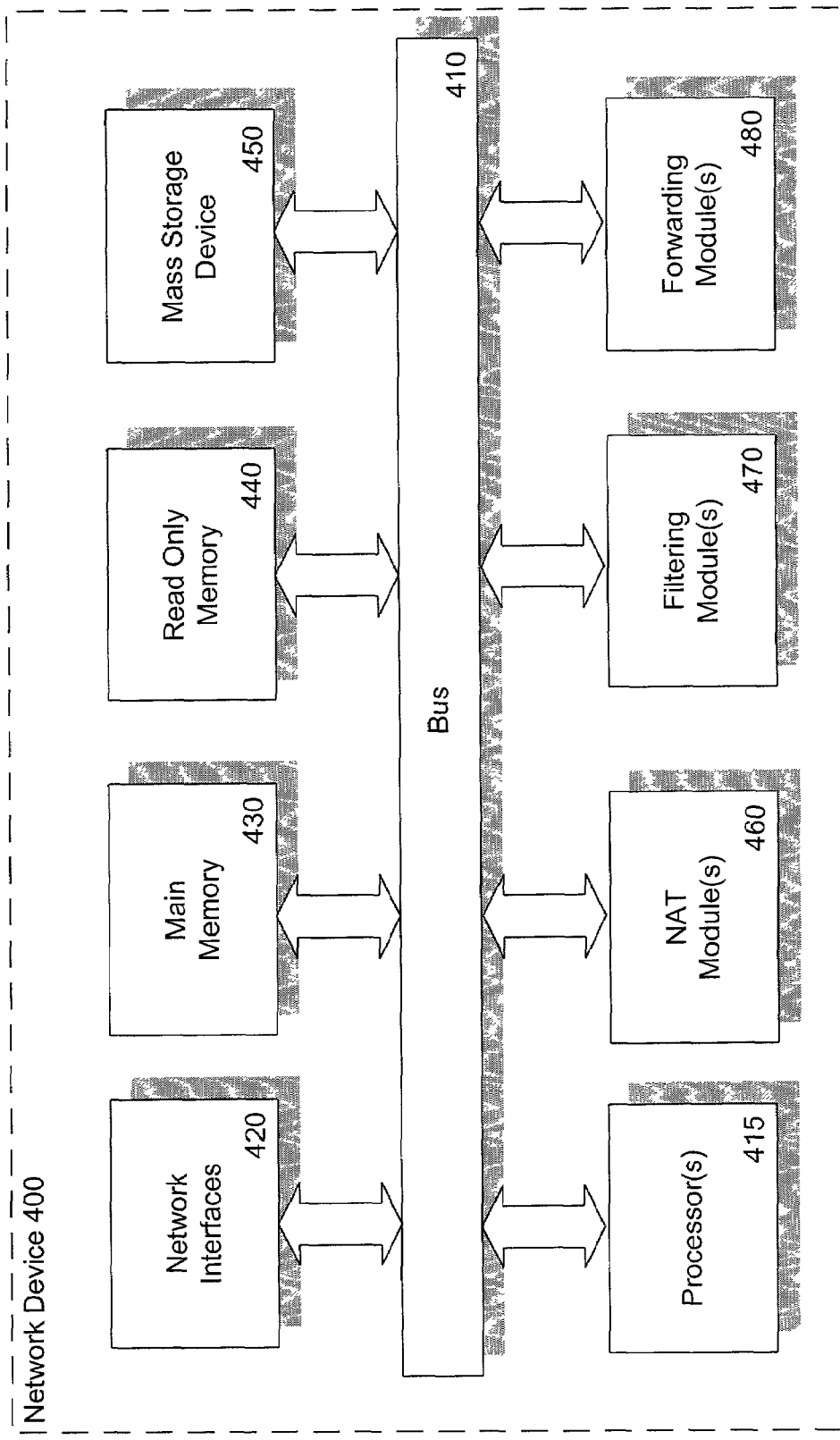
FIG. 4 is a high-level block diagram of a network device according to one embodiment of the present invention.

FIG. 4 is a simplified, high-level block diagram of a network device 400 according to one embodiment of the present invention. The network device 400 represents an exemplary network computing or network communication device, such as a gateway, a router, a bridge, a switch, a firewall, or an Internet access product, in which features of the present invention may be implemented. In this example, network device 400 comprises a communication means, such as a bus 410, for communicating information, and a processing means, such as one or more processors 415, coupled with bus 410 for processing information and executing instructions.

Network device 400 also includes network interfaces 420 coupled to bus 410 for allowing communication and exchange of information to/from with the network device 400 by way of a Local Area Network (LAN), Wide Area Network (WAN), Metropolitan Area Network (MAN), the Internet, or the public switched telephone network (PSTN), for example. The network interfaces 420 may include various combinations of well-known interfaces, such as one or more 10/100 Ethernet ports, one or more Gigabit Ethernet ports (fiber and/or copper), or other well-known interfaces, such as Digital Subscriber Line (DSL) interfaces, Asynchronous Transfer Mode (ATM) ports and other interfaces commonly used in existing public or private network environments. In any event, in this manner, the network device 400 may communicate with a number of other network devices, clients and/or servers via a conventional network infrastructure, such as a company's Intranet and/or the Internet, for example.

The network device 400 further comprises multiple modules for performing various packet-processing tasks, such as one or more NAT modules 460 for applying network address translation on received and/or transmitted packets, one or more filtering modules 470 for performing receive and/or transmit packet filtering, and one or more forwarding modules 480 for making forwarding decisions.

The network device 400 also includes a main memory 430 that is coupled to bus 410 for storing information and instructions to be used and/or executed by processor 415, NAT module 460, filtering module 470, and/or forwarding module 480. The main memory may comprise one or more types of random access memory (RAM), such as static RAM (SRAM) for caching and dynamic RAM (DRAM), synchronous DRAM (SDRAM), or other dynamic storage device for larger run-time storage needs. Therefore, main memory 430 may be used for storing temporary variables or other intermediate information, such as lookup tables or one or more unified caches, during execution of instructions by processor 415.

Network device 400 also comprises a read only memory (ROM) 440 and/or other static storage device coupled to bus 410 for storing static information and instructions for processor 415. A data storage device 450, such as a flash disk, magnetic disk or optical disc and a corresponding drive, may also be coupled to bus 410 for storing information and instructions.

In the above description, in order to facilitate explanation, the various functional units, such as processor 415, NAT module 460, filtering module 470, and forwarding module 480, are generally discussed as if they were each a single device or process. However, each functional unit may actually comprise multiple physical and/or logical devices connected in a distributed architecture. Additionally, various combinations of functional units may actually be consolidated as multiple execution units on the same silicon die. Additionally, in alternative embodiments, the functions performed by the various functional units may be distributed differently than as described. For example, particular functions might be divided across multiple processors.

Exemplary Network Processor

Figure 5:
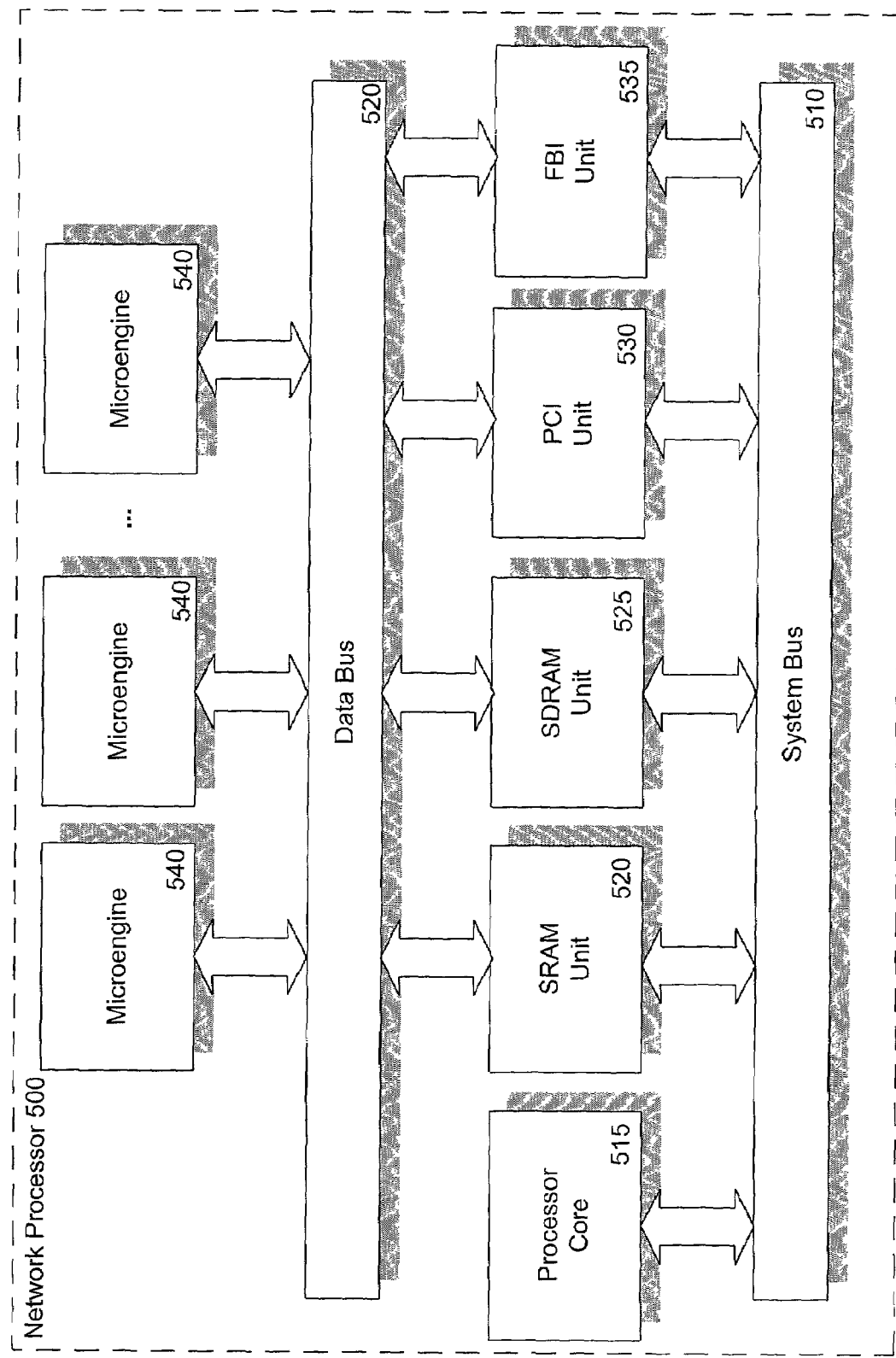
FIG. 5 is a block diagram of an exemplary network processor.

FIG. 5 is a block diagram of an exemplary network processor 500. The network processor 500 represents an exemplary processor, such as processor 415, that may be used in a network device, such as network device 400, the unified cache implementation described herein. According to one embodiment, the network processor comprises the Intel® IXP 1200 Network Processor (INTEL is a registered trademark of Intel Corporation of Santa Clara, Calif.).

In this example, network processor 500 is a loosely-coupled hybrid parallel processor set combining an array of independent microengines 540 with a processor core 515. The microengines 540, such as 32-bit reduced instruction set computing (RISC) data engine with hardware multithread support, may contain sufficient processing power to perform packet-processing tasks typically reserved for high speed ASICs, such as NAT, packet forwarding, and packet filtering. The processor core 515, such as an Intel StrongARM core, may then be used for more complex tasks, such as address learning, building and maintaining forwarding tables and related unified caches, and network management.

In the embodiment depicted, the processor core 515 is coupled to a system bus 510 that couples the processor core 515 in communication with an SRAM unit 520, an SDRAM unit 525, a peripheral component interconnect (PCI) unit 530, and a fast bus interface (FBI) unit 535. The microengines 540 are coupled to a separate data bus 520 to which the SRAM unit 520, the SDRAM unit 525, the PCI unit 530, and the FBI unit 535 are also coupled and may therefore perform data movement and processing without assistance of the processor core 515.

According to one embodiment, the network processor 500 is fully programmable, thereby allowing packet-processing tasks to be partitioned or aggregated depending upon the needs of the particular implementation by allocating microengines 540, threads, and processing core tasks. For example, NAT, forwarding, and filtering may each be allocated to one or more separate microengines 540. Alternatively, all three of these packet-processing tasks may be distributed among multiple microengines 540.

Unified Cache Update Processing

Figure 6:
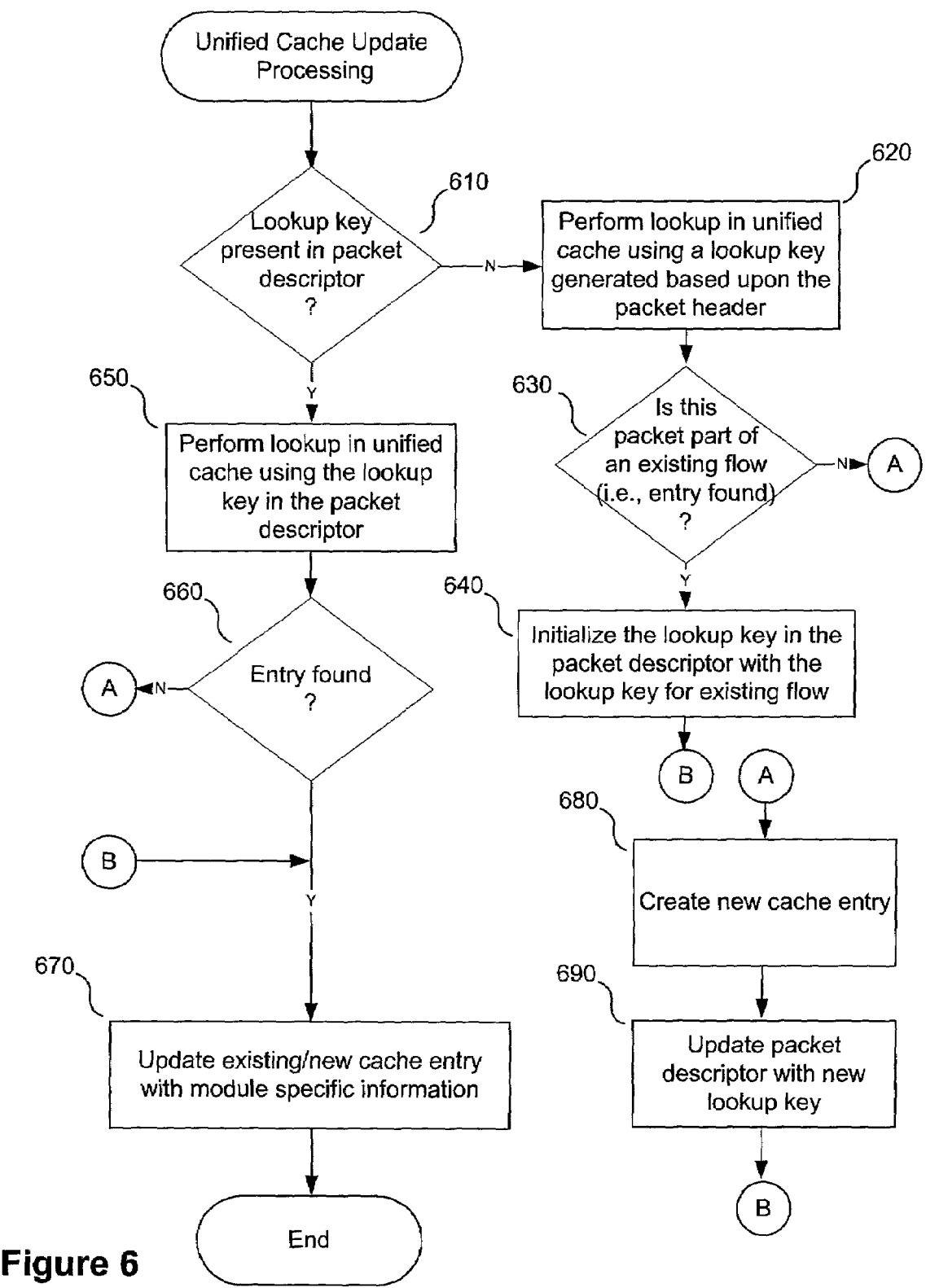
FIG. 6 is a flow diagram illustrating unified cache update processing according to one embodiment of the present invention.

FIG. 6 is a flow diagram illustrating unified cache update processing by the slow path according to one embodiment of the present invention. In one embodiment, the actions described below may be performed under the control of one or more programmed processors, such as processor core 515 and/or microengines 540. However, in alternative embodiments, the actions may be fully or partially implemented by any programmable or hardcoded logic, such as Field-Programmable Gate Arrays (FPGAs), transistor-transistor logic (TTL), or Application Specific Integrated Circuits (ASICs), for example.

The unified cache update process generally breaks down into a new flow detection stage, a new cache entry creation stage, a packet tagging stage for existing flows, and a cache entry update stage. The new flow detection stage is represented by blocks 610-630, the new cache entry creation stage includes blocks 680 and 690, the packet tagging stage for existing flows is represented by block 640, and the cache entry update stage is represented by block 670. Briefly, during basic packet flow in the slow path, the first packet-processing task (e.g., NAT, filtering, or forwarding) to determine that the packet being processed is part of an existing flow tags the packet with the lookup key associated with the existing flow. If a packet-processing task determines that the packet being processed is part of a new flow, the packet-processing task creates a new cache entry for the flow in the unified cache and tags the packet with the corresponding lookup key for the new cache entry.

Importantly, in the embodiment depicted, the only communication between the various packet-processing modules is the lookup key embedded in the internal packet descriptor. This mechanism makes distributed processing possible in a very elegant and simple manner as a lookup in the unified cache will fail if the entry being sought has been deleted by another module. As a result, no cache synchronization protocol is necessary.

Unified cache update processing by the slow path begins with the new flow detection stage at decision block 610. At decision block 610, a determination is made whether lookup key information is present in the packet descriptor associated with the packet being processed. If the lookup key information is present, then the packet has already been classified and tagged and processing continues with block 650. Otherwise, the packet has not yet been tagged and processing continues with block 620. According to one embodiment, when a packet descriptor is first associated with a packet, the lookup key information may be initialized with a value that identifies the lookup key information as being invalid.

Assuming in this example, that the lookup information has not yet been set to the value of a valid lookup key, processing continues with block 620 where a lookup is performed on the unified cache using a lookup key generated based upon the current content of the packet header. At decision block 630, a determination is made whether the packet is part of an existing flow based upon whether an entry is found during the lookup initiated by block 620. If an entry is indeed found, then the packet is classified as part of the existing flow associated with the found entry and processing continues with the tagging stage for existing flows at block 640. Otherwise, the packet is classified as part of a new flow and processing continues with block 680 to commence the new cache entry creation stage.

At block 640, the packet is tagged as being part of the existing flow by initializing the value of the lookup key in the packet descriptor with the value of the lookup key for the existing flow. Following block 640, processing continues with block 670 to perform the cache entry update stage.

Returning now to decision block 610, assuming the lookup information is present in the packet descriptor, then, at block 650, a unified cache lookup is performed using that information. It is worth noting again that this lookup solves the synchronization problem between multiple distributed modules sharing the unified cache, as the lookup will fail if the entry has been deleted as was the case in the example of FIG. 3.

At decision block 660, a determination is made whether an entry was found in response to the lookup of block 650. If not, then the new cache entry creation stage is performed by proceeding to block 680. Otherwise, if an entry was found, then the cache entry update stage is performed by continuing with block 670.

At block 680, a new cache entry is created and inserted into the unified cache as a result of either a new flow being detected or a unified cache entry having been deleted. At block 690, the packet descriptor associated with the packet being processed is updated to include the new lookup key. Depending upon the application, the lookup key may be based upon more or less information in the packet header or even different fields. For example, according to one embodiment, the lookup key employed for full firewalling and filtering is generated based upon the 5 tuple comprising the IP source address, the IP destination address, the IP protocol, the IP source port, and the IP destination port. However, only a subset of these fields, such as the IP source address and the IP destination address, are needed to generate the lookup key if the network device is only performing routing. Additionally, for IPsec, the SPI is used instead of the source port and the destination port. Therefore, according to one embodiment, the unified cache may be optimized for the particular registered users (e.g., NAT, filtering, forwarding, etc.) of the unified cache.

At block 670, the cache entry update stage is performed for new or existing cache entries. The entry found in block 640 or 650, or the entry created in block 680 is now modified in a module-dependent manner. That is, module specific information may be added, deleted, or otherwise manipulated depending upon the needs of the particular module performing the unified cache update process. During slow path processing, for example, NAT populates the fields of the cache entry that it employs based upon information retrieved from a NAT rule table. A different set of fields in the cache entry may be populated by the filtering module with information from a filter rule table. Yet another independent set of fields may be populated by the forwarding module based upon a lookup performed on the full routing table. Additionally, modules may be interested in collecting various metrics. For example, the filtering module may track the number of packets that are filtered from a particular source IP address; while the forwarding module may track the duration of IP flows involving a particular IP destination address.

Figure 7:
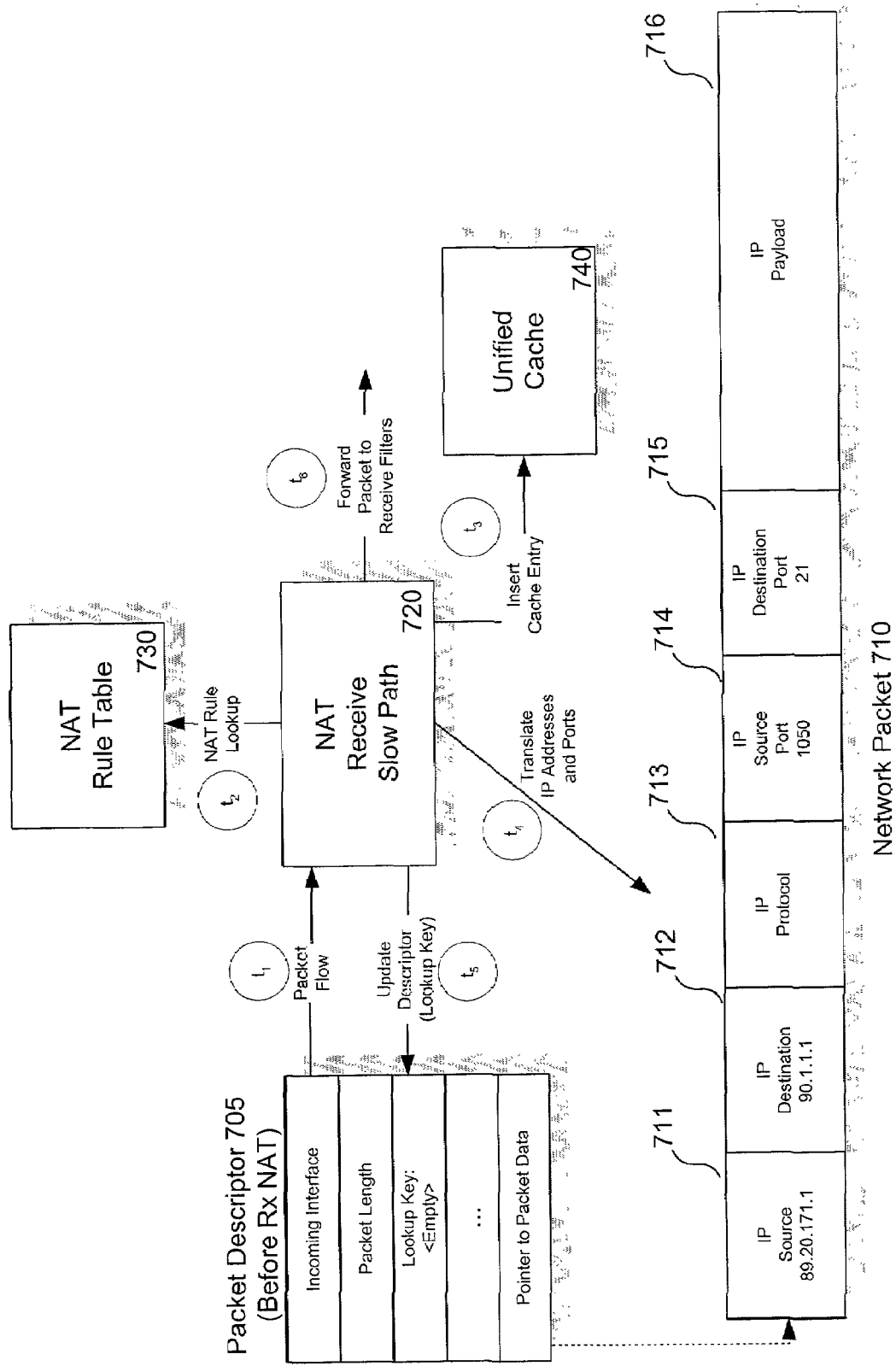
FIG. 7 is a block diagram that conceptually illustrates basic packet flow when a new flow is detected and is received by the NAT receive slow path according to one embodiment of the present invention.

FIG. 7 is a block diagram that conceptually illustrates basic packet flow when a new flow is detected and is received by the NAT receive slow path according to one embodiment of the present invention. In this example, a packet descriptor 705 associated with a network packet 710 is shown in a state before receive NAT processing has been completed.

At time, $t_1$, the packet descriptor 705 is received by the NAT receive slow path 720. According to the embodiment depicted, the packet descriptor includes a field identifying the incoming interface, the packet length, the lookup key, and a pointer to the packet data. The incoming interface identifies directly or indirectly the logical interface upon which the network packet 710 was received. The packet length indicates the length of the packet in bytes. Depending upon the implementation, the lookup key may represent a value, such as a hash value, for use in directly performing the lookup in the unified cache or the lookup key may represent the raw data from the original packet header upon which the hash value is based. The pointer to the packet data is the address of the start of the network packet 710. In this example, the network packet 710 is depicted as an IP packet with an IP header 711-715 and an IP payload 716. The IP header includes an IP source address 711, an IP destination address 712, and IP protocol indicator 713, an IP source port 714, and an IP destination port 715.

Depending upon the implementation, more or less fields may be included in the packet descriptor 705. For example, according to one embodiment, a separate unified cache is associated with each logical interface and the cache is only used for incoming packets on a specific interface. That is, all lookups/insertions are based on the receiving interface. In an embodiment in which a single unified cache is employed, however, the incoming interface field may not need to be included as part of the packet descriptor 705.

At time, $t_2$, because the lookup key in the packet descriptor 705 is empty, a lookup key is formed based upon the contents of the network packet's IP header 711-715 and a lookup is performed in the NAT rule table 730. In order to expedite processing of subsequent packets associated with the same packet flow, at time, t3, the flow is classified and a new cache entry that has been initialized to include appropriate translation rules for this flow is inserted into the unified cache 740 based upon the lookup key. At time, $t_4$, the NAT receive slow path 720 may translate one or more of the IP source address 711, the IP destination address 712, the IP source port 714, and the IP destination port 715. At time, $t_5$, to resolve the problem described above with respect to FIG. 2, the lookup key used to insert the cache entry is stored in the packet descriptor 705 thereby ensuring consistency among the modules in terms of unified cache access. Finally, at time, t6, the packet is forwarded to the next packet-processing task, which in this example is the receive filters.

Figure 8:
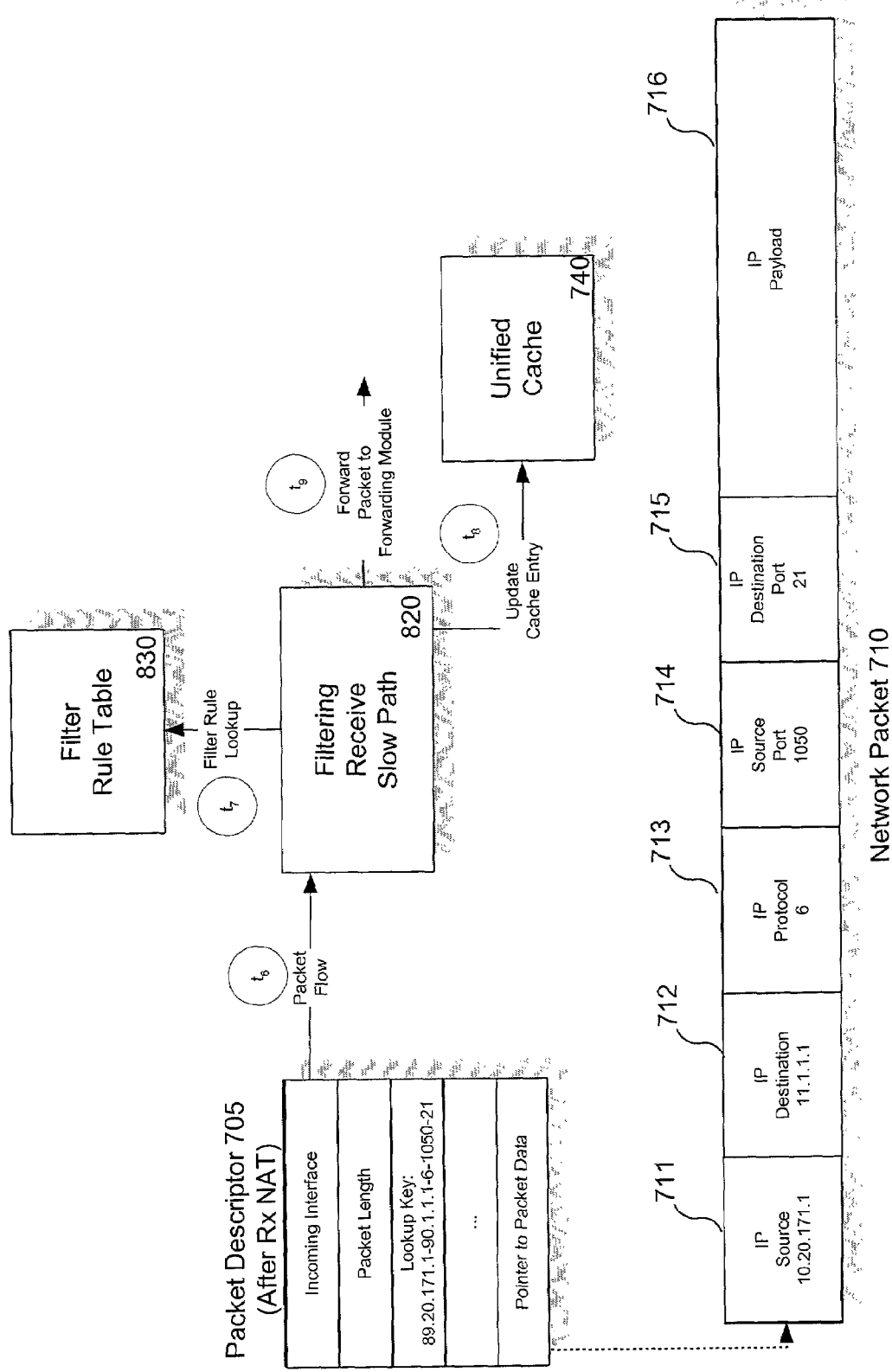
FIG. 8 is a block diagram that conceptually illustrates basic packet flow when a new flow is detected and is received by the filtering receive slow path according to one embodiment of the present invention.

FIG. 8 is a block diagram that conceptually illustrates basic packet flow when a new flow is detected and is received by the filtering receive slow path according to one embodiment of the present invention. Continuing the example that begun with FIG. 7, the packet descriptor 705 is now shown in a state after receive NAT processing has been completed. Consequently, the lookup key field in the packet descriptor 705 is populated with the lookup key used to insert the unified cache entry and various fields of the IP header 711-715 may be modified from their initial values. In this example, the IP source address 711 has been translated from 89.20.171.1 to 10.20.171.1 and the IP destination address 712 has been translated from 90.1.1.1 to 11.1.1.1.

At time, $t_6$, the packet descriptor 705 is received by the filtering receive slow path 820 from the NAT receive slow path 720. According to one embodiment, the packet descriptor 750 is passed as a parameter among module calls. In alternative embodiments, the packet descriptor 750 may be stored in a globally accessible memory. In any event, at time, $t_7$, the filtering receive slow path retrieves the appropriate filtering instructions for this flow from the filter rule table 830. At time, $t_8$, the cache entry inserted by the NAT receive slow path 720 at time, $t_3$, is retrieved using the lookup key in the packet descriptor 705 and updated to include the filtering instructions. Notably, had the filtering receive slow path 820 used the current IP header 711-715, a different lookup key would have been generated, the cache entry inserted by the NAT receive slow path 720 would not have been found, and a duplicate entry would have been created as in the example of FIG. 2. However, because this module has access to the lookup key that was used to insert the cache entry, consistency of access is assured and the unnecessary creation of duplicate cache entries is avoided. At this point, the network packet 710 is either filtered (discarded) or passed to the next module based upon the filtering rules applicable to this network packet 710. Assuming the packet is not filtered, at time, $t_9$, it is forwarded to the forwarding module.

Figure 9:
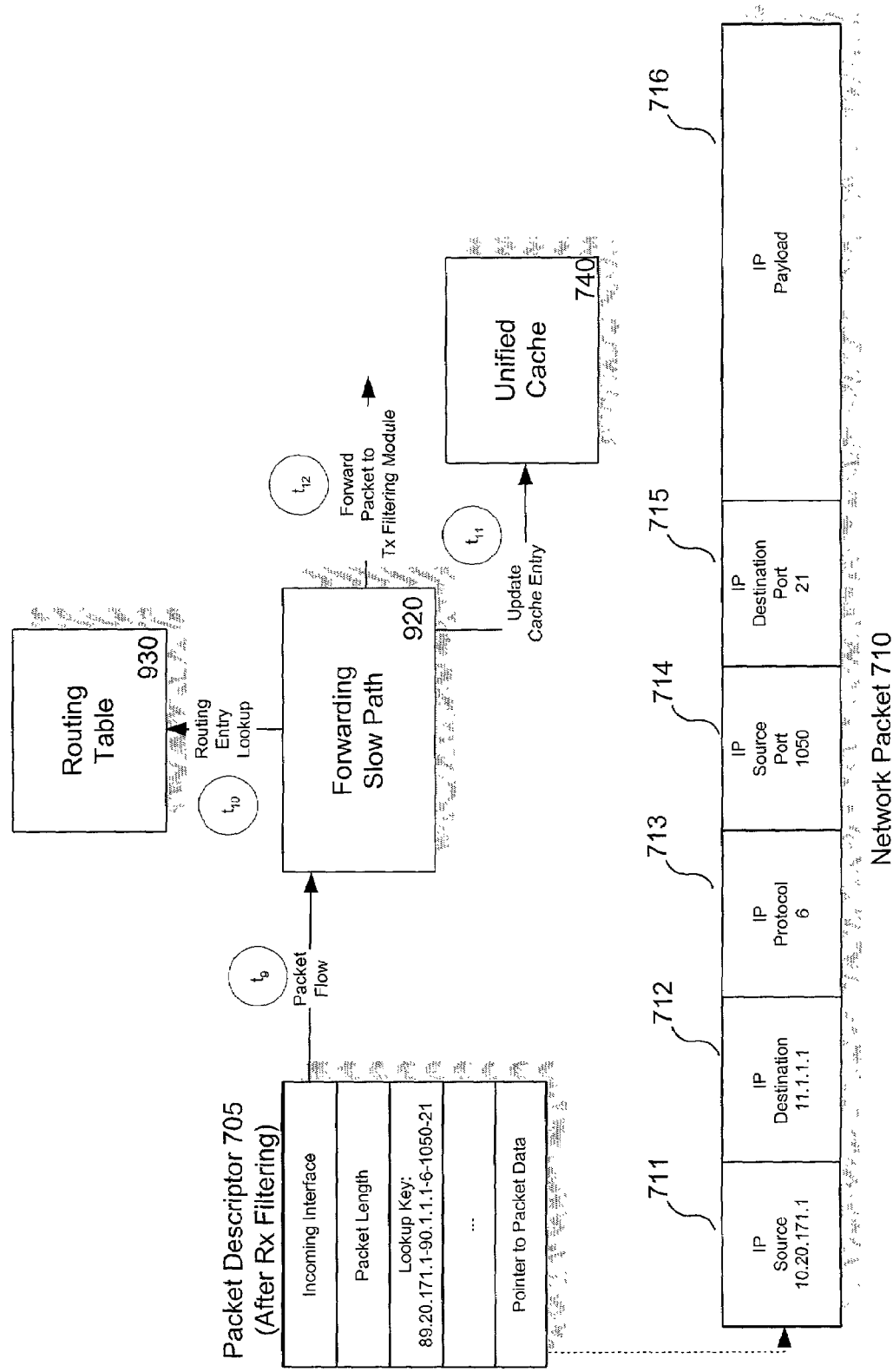
FIG. 9 is a block diagram that conceptually illustrates basic packet flow when a new flow is detected and is received by the forwarding slow path according to one embodiment of the present invention.

FIG. 9 is a block diagram that conceptually illustrates basic packet flow when a new flow is detected and is received by the forwarding slow path according to one embodiment of the present invention. Continuing the example from where it left off in FIG. 8, at time, $t_9$, the packet descriptor 705 is received by the forwarding slow path 920. At time, $t_{10}$, the forwarding slow path 920 performs a lookup in the routing table 930 to retrieve the appropriate routing instructions with regard to the network packet 710 and other packets associated with this flow. The forwarding slow path 920, then at time, t11, updates the cache entry in the unified cache 740 created by the NAT receive slow path 720 and modified by the filtering receive slow path 820. While not illustrated, the remainder of the slow path, e.g., filtering transmit slow path and NAT transmit slow path, is handled in a similar manner.

Alternative Embodiments

In the examples described above, the unified cache lookup key is transferred or made available to those of the slow path modules sharing the unified cache. While this mechanism has the advantage of making distributed processing possible in a very elegant and simple manner without the need for a cache synchronization protocol, in alternative embodiments, it may be useful to pass a pointer to the unified cache entry along with an incarnation count to the slow path instead. According to this embodiment, a cache manager tracks the validity of the unified cache entries by updating incarnation counts. Before a slow path module attempts to make use of the pointer to the unified cache entry, the module asks the cache manager whether the entry is still valid and the cache manager compares an internal incarnation count with the incarnation count associated with the pointer reference.

In the examples described above, for simplicity, reference is made to a single unified cache. It should be understood, however, that the use of multiple unified caches is contemplated according to various embodiments. For example, rather than one centralized unified cache, according to one embodiment, a separate unified cache may be associated with a group of one or more logical or physical network interfaces. Additionally, for purposes of handling packets generated by the network device itself, a separate cache may be maintained for handling such internally generated packets.

While in various embodiments described above, either the first packet-processing application to receive the packet or the NAT receive slow path is the module assumed to tag the packet with the cache lookup key, in alternative embodiments, the tagging may be performed upon receipt at the physical or logical interface. Another option is to tag the packet if and when the packet header is first modified.

Finally, while NAT is used as an example of a packet-processing application that involves modification of a portion of a packet used for cache lookup key generation, it should be appreciated that the packet tagging approach described herein is applicable to various other current or future packet-processing applications involving the modification of all or part of a portion of a network packet that is used for cache lookup key generation.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
    receiving a packet at a network device, the packet including a header and a payload;
    tagging the packet, by a first packet-processing application, with a cache lookup key based upon original contents of the header, the cache lookup key indicating where in a unified cache a cache entry corresponding to the packet will be stored, the cache lookup key being stored in a field of the unified cache, and the cache lookup key being part of a packet descriptor of the packet;
    translating the header of the packet from the original contents by an address translation packet-processing application after tagging the packet;
    forwarding the packet descriptor and the packet to a second packet processing application after translating the header; and
    the second packet-processing application accessing the cache entry from the unified cache using the cache lookup key from the packet descriptor added by the first packet processing application, wherein the unified cache is shared by multiple packet forwarding processes and allows a flow to be classified once and then subsequent packets can be processed with a single lookup in the unified cache.

2. The method of claim 1, wherein said tagging the packet with a cache lookup key comprises populating a lookup key field of an internal packet descriptor corresponding to the packet with a hash value.

3. The method of claim 2, wherein the packet comprises an Internet Protocol (IP) packet and the cache lookup key is based upon a source IP address of the header, a destination IP address of the header, a source port of the header, a destination port of the header, and a protocol value in the header.

4. The method of claim 1, wherein the packet-processing applications includes applying one or more of Network Address Translation (NAT), packet filtering, and packet routing.

5. The method of claim 4, wherein the packet-processing applications are distributed among two or more processors of the network device.

6. The method of claim 1, wherein the first packet-processing application comprises a NAT process.

7. The method of claim 6, further comprising the second packet-processing application updating the cache entry with information specific to the second packet-processing application by using the cache lookup key to access the cache entry.

8. A method comprising the steps of:
a step for determining whether a cache lookup key is present in a packet descriptor associated with a received packet;
a step for performing a lookup in a unified cache with the cache lookup key if it is determined that the cache lookup key is present in the packet descriptor;
a step for creating a new cache entry in the unified cache based upon information in a header of the received packet and tagging the packet with a new cache lookup key if it is determined that the cache lookup key is not present in the packet descriptor or the lookup does not locate an appropriate existing cache entry, the new cache lookup key being based upon contents of the header of the packet;
a step for storing the new cache lookup key in a field of the unified cache;
a step for conveying the cache lookup key from a NAT packet-processing task to a packet filtering packet-processing task;
a step for updating an existing cache entry with module-specific information by the NAT packet processing task, the updating including translating the header of the packet; and
a step for accessing the new cache entry from the unified cache by the packet-filtering packet processing task using the cache lookup key, after translating the header, wherein the unified cache is shared by multiple packet forwarding processes and allows a flow to be classified once and then subsequent packets can be processed with a single lookup in the unified cache.

9. The method of claim 8, wherein the unified cache is implemented as a hash table and tagging the packet comprises generating a hash value based upon at least a source address and a destination address in the header and storing the hash value in the packet descriptor.

10. The method of claim 8, wherein the unified cache is utilized by a plurality of distributed packet-processing tasks including Network Address Translation (NAT), packet filtering, and packet forwarding.

11. A machine-readable medium having stored thereon data representing instructions that, if executed by one or more processors of a network device, cause the one or more processors to:
receive a packet including a header and a payload;
tag the packet, by a first packet-processing application of a plurality of packet-processing applications, with a cache lookup key based upon original contents of the header, the cache lookup key indicating where in a unified cache a cache entry corresponding to the packet will be stored;
the cache lookup key being stored in a field of the unified cache, and the cache lookup key being part of a packet descriptor of the packet;
translate the header of the packet from the original contents by an address translation packet-processing application after tagging the packet;
forward the packet descriptor and the packet to a second packet processing application after translating the header; and
use the cache lookup key from the packet descriptor rather than generating a new cache lookup key based upon current contents of the header by a second application accessing the cache entry from the unified cache subsequent to the tagging by the first packet-processing application, wherein the unified cache is shared by multiple packet forwarding processes and allows a flow to be classified once and then subsequent packets can be processed with a single lookup in the unified cache.

12. The machine-readable medium of claim 11, wherein tagging the packet with a cache lookup key comprises populating a lookup key field of an internal packet descriptor corresponding to the packet with a hash value.

13. The machine-readable medium of claim 11, wherein the packet comprises an Internet Protocol (IP) packet and the cache lookup key is based upon a source IP address of the header, a destination IP address of the header, a source port of the header, a destination port of the header, and a protocol value in the header.

14. The machine-readable medium of claim 11, wherein the plurality of packet-processing applications includes applying one or more of Network Address Translation (NAT), packet filtering, and packet routing.

15. The machine-readable medium of claim 11, wherein the plurality of packet-processing applications are distributed among at least two processors of the network device.

16. The machine-readable medium of claim 15, wherein the plurality of packet-processing applications include Network Address Translation (NAT), packet filtering, and packet forwarding.

17. The machine-readable medium of claim 11, wherein the first packet-processing application comprises a NAT process initiate the second packet-processing application of the plurality of packet-processing applications subsequent to the NAT process.

18. The machine-readable medium of claim 17, wherein the first packet-processing application comprises a NAT process that modifies the header of the packet, wherein the instructions further cause the one or more processors to:
access the cache entry, from the second packet-processing application, by using the cache lookup key; and
update the cache entry, by the second packet-processing application, with information specific to the second packet-processing application.

19. The machine-readable medium of claim 11, wherein the unified cache is implemented as a hash table and tagging the packet comprises generating a hash value based upon at least a source address and a destination address in the header and storing the hash value in the packet descriptor.

20. The machine-readable medium of claim 11, wherein the network device comprises a router.

21. The machine-readable medium of claim 11, wherein the network device comprises a switch.

* * * * *

UNITED STATES PATENT AND TRADEMARK OFFICE
CERTIFICATE OF CORRECTION

| | |
|---|---|
| PATENT NO. | : 7,269,663 B2 |
| APPLICATION NO. | : 09/967084 |
| DATED | : September 11, 2007 |
| INVENTOR(S) | : Beier et al. |

Page 1 of 1

It is certified that error appears in the above-identified patent and that said Letters Patent is hereby corrected as shown below:

In column 8, at line 18, delete "barcoded" and insert --hardcoded--.

Signed and Sealed this

Fifteenth Day of April, 2008

JON W. DUDAS
*Director of the United States Patent and Trademark Office*